United States Patent
Herr-Rathke et al.

(10) Patent No.: US 9,205,721 B2
(45) Date of Patent: Dec. 8, 2015

(54) CROSS-CAR STRUCTURAL SUPPORT WITH INTEGRATED HVAC FLOOR DUCT

(71) Applicant: FORD GLOBAL TECHNOLOGIES, LLC, Dearborn, MI (US)

(72) Inventors: Jennifer A. Herr-Rathke, Plymouth, MI (US); Eric R. Yerke, Redford, MI (US); James R. Hurd, Canton, MI (US); Paul B. Hoke, Plymouth, MI (US); Kalyanaraman Bharathan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 46 days.

(21) Appl. No.: 14/173,158

(22) Filed: Feb. 5, 2014

(65) Prior Publication Data

US 2015/0217624 A1   Aug. 6, 2015

(51) Int. Cl.
  *B62D 25/08* (2006.01)
  *B60H 1/00* (2006.01)
  *B62D 25/14* (2006.01)

(52) U.S. Cl.
  CPC ............ *B60H 1/00564* (2013.01); *B62D 25/08* (2013.01); *B62D 25/142* (2013.01)

(58) Field of Classification Search
  CPC ........... B60H 1/00035; B60H 1/00564; B60H 1/242; B60H 2001/00185; B60H 2001/002; B62D 25/08; B62D 25/14; B62D 25/142; B62D 25/145
  See application file for complete search history.

(56) References Cited

U.S. PATENT DOCUMENTS

| | | | | |
|---|---|---|---|---|
| 4,391,465 A * | 7/1983 | Piano | ............................ | 296/208 |
| 5,312,133 A * | 5/1994 | Pietila et al. | .................. | 280/752 |
| 5,354,114 A * | 10/1994 | Kelman et al. | ................ | 296/192 |
| 5,979,965 A * | 11/1999 | Nishijima et al. | .............. | 296/70 |
| 6,155,631 A * | 12/2000 | Yoshinaka et al. | ........ | 296/193.02 |
| 6,409,590 B1 * | 6/2002 | Suzuki et al. | ................. | 454/143 |
| 6,851,742 B1 * | 2/2005 | Kubiak | ..................... | 296/193.02 |
| 6,955,394 B1 | 10/2005 | Reddig et al. | | |
| 7,000,969 B2 | 2/2006 | Baker et al. | | |
| 7,841,648 B2 * | 11/2010 | Perarnau Ramos et al. | ........................ | 296/193.02 |
| 8,376,444 B2 | 2/2013 | Scheib et al. | | |
| 8,512,110 B2 | 8/2013 | Billard et al. | | |
| 8,979,176 B2 * | 3/2015 | Atsumi | .................... | 296/193.02 |

(Continued)

FOREIGN PATENT DOCUMENTS

| | | | | |
|---|---|---|---|---|
| DE | 4232847 A1 * | 3/1994 | ............. | B60K 37/00 |
| DE | 102009044417 A1 * | 5/2011 | ............. | B62D 25/00 |

(Continued)

*Primary Examiner* — Glenn Dayoan
*Assistant Examiner* — Paul Chenevert
(74) *Attorney, Agent, or Firm* — Vichit Chea

(57) ABSTRACT

A cross-car structure integrates an HVAC duct with a structural beam. An upper steel beam has opposing ends attached to opposite body sides. A pair of center brackets extend downward from the upper steel beam. An HVAC unit secured to a center bracket has an outlet for an air flow for ventilating a floor region. A plastic cross member has a center plate secured to the center brackets, a first hollow beam extending from the center plate to one steel beam end, and a second hollow beam extending from the center plate to the other steel beam end. Each hollow beam has an in-board opening fluidically coupled to the HVAC outlet and at least one floor outlet directed toward the floor region thereby providing a respective HVAC duct between the outlet of the HVAC unit and each of the floor outlets.

6 Claims, 4 Drawing Sheets

(56) References Cited

U.S. PATENT DOCUMENTS

| | | |
|---|---|---|
| 2001/0047899 A1 | 12/2001 | Ikeda |
| 2002/0024236 A1* | 2/2002 | Scheib et al. ............ 296/203.02 |
| 2002/0145309 A1* | 10/2002 | Shikata et al. ................ 296/208 |
| 2003/0010474 A1* | 1/2003 | Araki et al. ..................... 165/42 |
| 2004/0043719 A1* | 3/2004 | Nakamura et al. ............ 454/145 |
| 2004/0188885 A1* | 9/2004 | Lorenzo et al. ............ 264/328.1 |
| 2004/0203333 A1* | 10/2004 | Yeon ............................ 454/121 |
| 2005/0048904 A1* | 3/2005 | Lee ............................... 454/127 |
| 2005/0285433 A1 | 12/2005 | Baudouin |
| 2006/0017309 A1* | 1/2006 | Wolf ....................... 296/193.02 |
| 2007/0123157 A1 | 5/2007 | Shah et al. |
| 2007/0132280 A1* | 6/2007 | Wolf ............................ 296/208 |
| 2007/0245758 A1* | 10/2007 | Binder et al. ................. 62/259.4 |
| 2009/0256400 A1* | 10/2009 | Descamps ..................... 296/205 |
| 2013/0257106 A1 | 10/2013 | Sawyer et al. |
| 2013/0320695 A1* | 12/2013 | Wenzel et al. .................. 296/72 |
| 2015/0056428 A1* | 2/2015 | Birka ............................ 428/209 |

FOREIGN PATENT DOCUMENTS

| | | | |
|---|---|---|---|
| DE | 102010014538 A1 * | 10/2011 | ............ B62D 25/14 |
| DE | 102013013363 A1 * | 4/2014 | ............ B62D 25/14 |
| EP | 1637440 A1 * | 3/2006 | ............ B62D 25/14 |
| EP | 1842714 A1 * | 10/2007 | ............ B60K 37/00 |
| FR | 2120570 A5 * | 8/1972 | ............ F24F 13/00 |
| FR | 2975963 A1 * | 12/2012 | ............ B62D 25/14 |
| FR | 2979320 A1 * | 3/2013 | ............ B62D 25/14 |
| FR | 2991655 A1 * | 12/2013 | ............ B62D 29/00 |
| JP | 2006027468 | 2/2006 | |
| JP | 2007230449 | 9/2007 | |
| WO | WO 0170558 A1 * | 9/2001 | ............ B62D 25/14 |
| WO | WO 2012110730 A1 * | 8/2012 | ............ B62D 25/14 |
| WO | WO 2014203448 A1 * | 12/2014 | ............... B60H 1/34 |

* cited by examiner

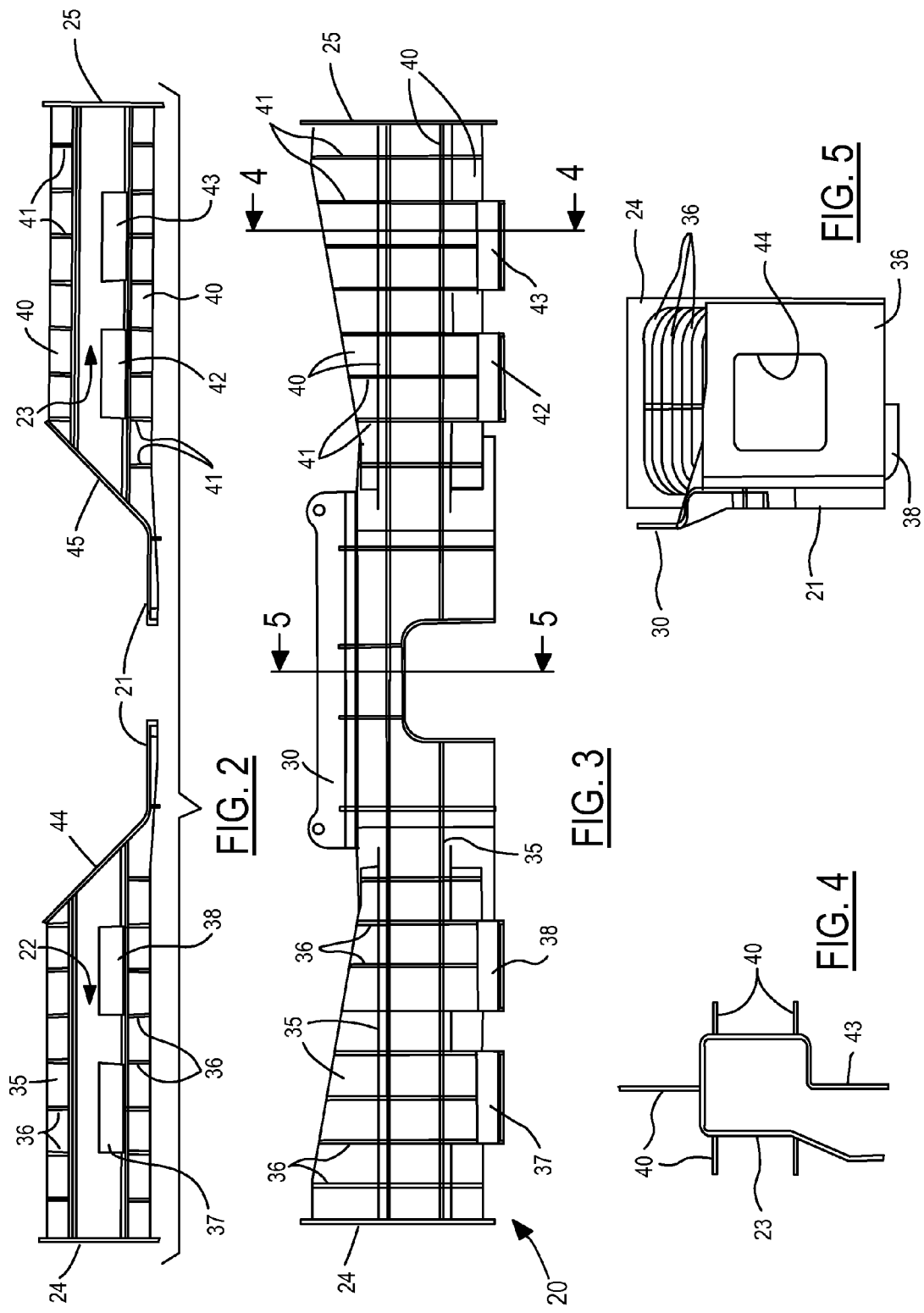

CROSS-CAR STRUCTURAL SUPPORT WITH INTEGRATED HVAC FLOOR DUCT

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to cross-car structures for instrument panel assemblies in motor vehicles, and, more specifically, to compact and efficient support structures integrating an HVAC floor duct with a structural beam.

According to the typical construction of a motor vehicle, an instrument panel (IP) assembly is installed in a vehicle body interior at the forward end of a passenger cabin between left and right body sides and above a floor pan. One or two steel cross-car beams provide structural support for a plastic IP substrate, various attachment brackets, and IP systems such as a heating, ventilating, air conditioning (HVAC) system, airbag supplemental restraint modules, instrumentation modules, storage bins, and other accessories. While the use of two steel beams provides enhanced stiffness, there is not always sufficient space for including two steel beams.

A current trend toward making smaller cabins together with a desire even for larger cars to utilize compact instrument panel assemblies to provide a more spacious interior for the occupants create challenges related to fitting all of the necessary components into the available space while maintaining the necessary structural integrity and robustness. Packaging of the HVAC module and associated ducting can be particularly problematic. Ducting performance may sometimes be compromised as a result of space and routing issues.

SUMMARY OF THE INVENTION

In one aspect of the invention, a cross-car structure is provided for a vehicle having a body with first and second sides and a floor. An upper steel beam with first and second opposing ends is provided for attaching to the first and second body sides. A pair of center brackets extend downward from the upper steel beam. An HVAC unit is secured with respect to at least one of the center brackets and has an outlet for an air flow for ventilating a floor region above the floor and between the first and second body sides. A plastic cross member has a center plate secured with respect to the center brackets, a first hollow beam extending from the center plate to the first end of the steel beam, and a second hollow beam extending from the center plate to the second end of the steel beam. Each hollow beam has an in-board opening fluidically coupled to the outlet of the HVAC unit. Each hollow beam has at least one floor outlet directed toward the floor region thereby providing a respective HVAC duct between the outlet of the HVAC unit and each of the floor outlets. Each hollow beam has a terminal rib at a remote end opposed to the in-board opening that seals the remote end. Each terminal rib is secured to a respective end of the upper steel beam.

BRIEF DESCRIPTION OF THE DRAWINGS

FIG. 2 is a bottom view of the plastic cross member of FIG. 1.

FIG. 3 is a front view of the plastic cross member of FIG. 1.

FIGS. 4 and 5 are cross-sectional views of the plastic cross member along lines 4-4 and 5-5, respectively.

DETAILED DESCRIPTION OF PREFERRED EMBODIMENTS

The present invention integrates a steel cross-car beam with a non-metallic cross member according to a particular spatial relationship resulting in a structure with high robustness and compact space utilization by integrating HVAC floor ducting. Rather than sacrificing climate performance with regard to air flow volume or the location of floor duct outlets, the integrated ducting of the present invention allows both attributes to be maintained at a satisfactory level without creating packaging issues. The invention achieves a highly desirable air distribution pattern by acting as a "shower duct" disposed across the floor zone, without the need for complex ducting that would otherwise been required.

The non-metallic material for the cross member is chosen to be heat insulating and easily formable into a structure with the desired load bearing properties. One preferred material is a moldable thermoplastic such as PVC, polyethylene, polypropylene, or advanced structural plastics. Other moldable materials that can be used for the invention include composites (such as compressed carbon fiber sheets) or laminates. Injection molding, extrusion, compression molding, and other molding processes can be used. All the foregoing materials are referred to herein as plastic.

Figure 1:
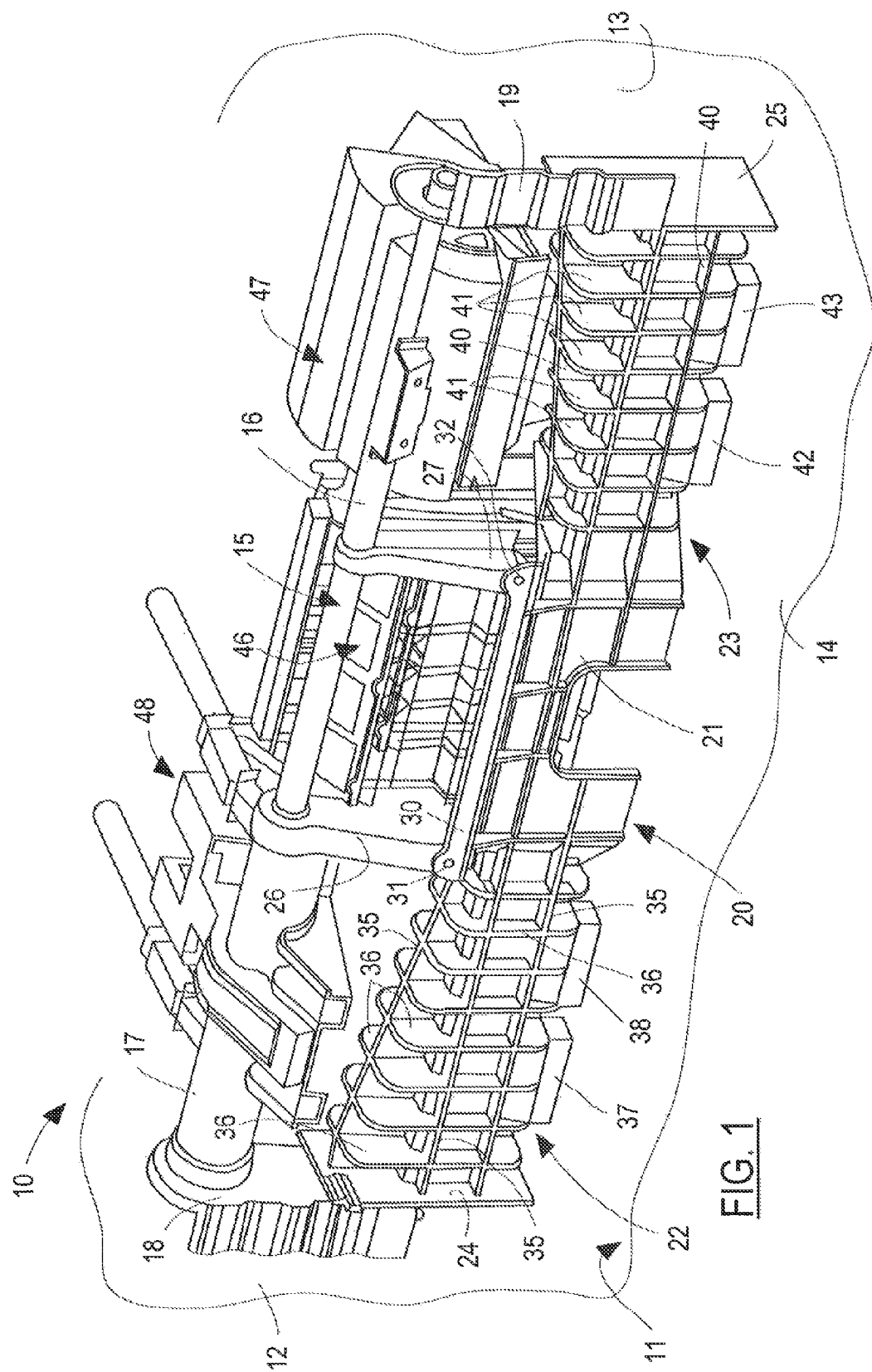
FIG. 1 is a front, top, right perspective view of a first embodiment of a cross-car structure of the invention.

Referring now to FIG. 1, a cross-car structure 10 is a foundation for an instrument panel subassembly that is installed onto a vehicle body 11 having sides 12 and 13 at opposed sides of a floor pan 14. Structure 10 obtains primary strength and rigidity from an upper steel beam 15 that extends between sides 12 and 13. Upper steel beam 15 may be a composite structure formed by tubes 16 and 17 of varying sizes joined by welding or other known methods. Upper steel beam 15 has steel end plates 18 and 19 at opposing ends for attaching to body sides 12 and 13 in a conventional manner.

A plastic cross member 20 is also secured between end plates 18 and 19 to simultaneously provide a structural function together with distribution of an air flow to a floor region between cross member 20 and floor pan 14. Plastic cross member 20 has a center plate 21 (shown with an inverted U-shape) with a first hollow beam 22 extending from center plate 21 to steel end plate 18 and a second hollow beam 23 extending from center plate 21 to steel end plate 19. Hollow beams 22 and 23 have terminal ribs 24 and 25 that seal the ends of hollow beams 22 and 23 and are used to secure them to plates 18 and 19.

A pair of steel center brackets 26 and 27 are connected to and extend vertically downward from upper steel beam 15 to attach to a flange 30 along an upper edge of center plate 21 via fastening holes 31 and 32. The location of fastening holes 31 and 32 and the spacing of center brackets 26 and 27 corresponds to the lateral extent of center plate 21, thereby providing a robust anchoring of center plate 21 and strong center support for hollow beams 22 and 23.

Hollow beams 22 and 23 are each formed as hollow tubes including i) one or more stiffening ribs disposed on the exterior or interior of the hollow tubes and ii) one or more floor outlets disposed at a bottom side of the tubes and directed toward the floor region. The floor outlets may or may not include a tube extension. More specifically, hollow beam 22 includes a plurality of stiffening ribs extending exteriorly including a first group of ribs 35 that extends longitudinally and a second group of ribs 36 oriented substantially transverse to and intersecting the first group of ribs 35. Each rib in groups 35 and 36 preferably extends as a planar fin from the hollow tube. Hollow beam 22 has longitudinally spaced floor outlets 37 and 38 formed as tube extensions that may also intersect with the stiffening ribs. External stiffening ribs such as ribs 35 and 36 may typically be smaller than as shown in FIGS. 1-6, where they are exaggerated for clarity of illustration. FIG. 7, for example, shows smaller ribs that provide sufficient rigidity and would be easier to package in the available space.

Hollow beam 23 includes a plurality of stiffening ribs extending exteriorly including a first group of ribs 40 that extends longitudinally and a second group of ribs 41 oriented substantially transverse to and intersecting the first group of ribs 40. Each rib in groups 40 and 41 preferably extends as a planar fin from the hollow tube. Hollow beam 23 has longitudinally spaced floor outlets 42 and 43 formed as tube extensions that may also intersect with the stiffening ribs.

As best shown in FIG. 2, hollow beams 22 and 23 include duct inlets 44 and 45, respectively, fluidically coupled with floor outlets 37, 38, 42, and 43. Inlets 44 and 45 have angled faces which are configured to sealingly couple with an airflow outlet from an HVAC chamber 46. HVAC chamber 46 together with another HVAC chamber 47 supply an airflow for ventilating the floor region. At least a portion of an HVAC case (e.g., chamber 46 and/or 47) is preferably mounted between center brackets 26 and 27, and is preferably secured with respect to at least one of the center brackets. Case 46/47 can be directly connected to center brackets 26 and 27, and is preferably directly secured with center plate 21, for example. Preferably, the HVAC may include a metal case that is secured to both first and second lateral edges of center plate 21 for stiffening. Thus, case 46 may provide additional support for plastic cross member 20. Upper steel beam 15 and/or brackets hung from upper steel beam 15 (such as center brackets 26 and 27) can further support additional components such as a steering support 48 and an instrument panel substrate (not shown).

FIG. 3 is a front view of cross member 20 indicating the locations of cross sections for FIGS. 4 and 5. As seen in FIG. 4, the stiffening ribs may be exclusively located on an exterior portion of hollow beam 23. Outlet 43 may be at least partially integrally-molded with hollow beam 23 or may be a separate component bonded onto an aperture formed in beam 23. The cross section of FIG. 5 shows an interior side of hollow beam 22 extending from inlet 44 to terminal rib 24, creating a duct for directing an air flow to outlets 37 and 38. In view of the hollow tube-shape coupled with the complex rib shapes, it is apparent from FIGS. 4 and 5 that cross member 20 could not be formed as a single molded piece because of the resulting die-lock conditions that would be unavoidable for injection molding. Therefore, cross member 20 may preferably be formed from two or more injection-molded pieces that are joined together. Preferably, center plate 21 is integrally molded with at least a portion of each of hollow beams 22 and 23. More particularly, each hollow beam may preferably be formed of two clamshell pieces bonded together using known methods.

Figure 6:
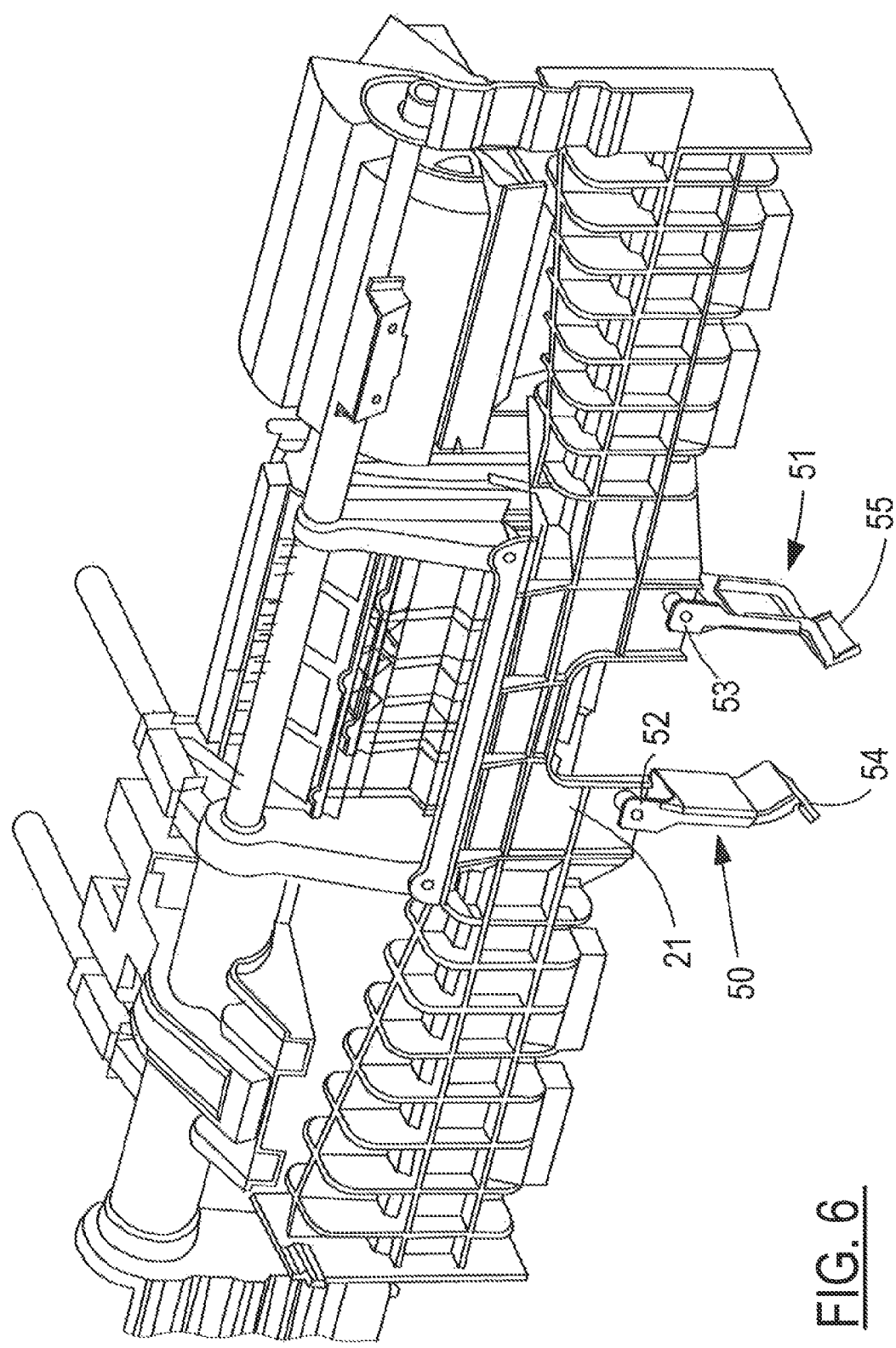
FIG. 6 is a front, top, right perspective view of a second embodiment of a cross-car structure of the invention.
Figure 7:
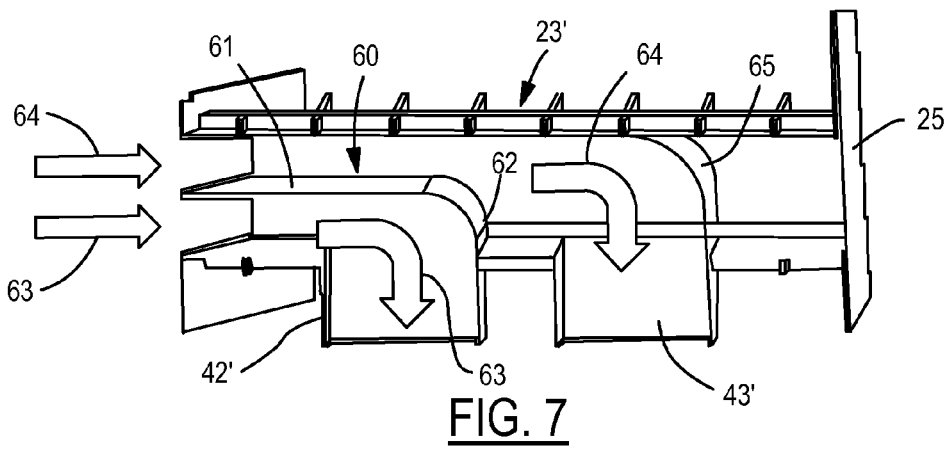
FIG. 7 is a cross sectional view showing a plastic cross member with interior stiffening ribs according to a third embodiment.

FIG. 6 shows a perspective view of a further embodiment of the invention wherein center plate 21 is additionally supported directly from beneath. Thus, steel brackets 50 and 51 are each secured at one end to center plate 21 by fasteners 52 and 53. Opposite ends 54 and 55 of brackets 50 and 51 connect to respective anchoring locations (not shown) on a floor pen or floor tunnel beneath the cross car structure.

In addition to or instead of stiffening ribs on the exterior side of the hollow beams, one or more interior stiffening ribs can be employed as shown in FIGS. 7-10. In FIG. 7, a first embodiment is shown wherein a hollow beam 23' includes an interior stiffening rib 60 longitudinally dividing at least a portion of hollow beam 23'. The duct is longitudinally divided in order to provide separate airflows to a pair of longitudinally spaced floor outlets 42' and 43'. Stiffening rib 60 is generally horizontal along a main portion 61, and includes a substantially vertical end portion 62 between outlets 42' and 43'. As a result of interior stiffening rib 60, a divided airflow comprised of airflow portions 63 and 64 are separately directed to outlets 42' and 43', respectively. Another internal stiffening rib 65 can optionally be provided to help direct airflow portion 64 more smoothly to outlet 43' and to provide additional strengthening and stiffening of hollow beam 23'.

Figure 8:
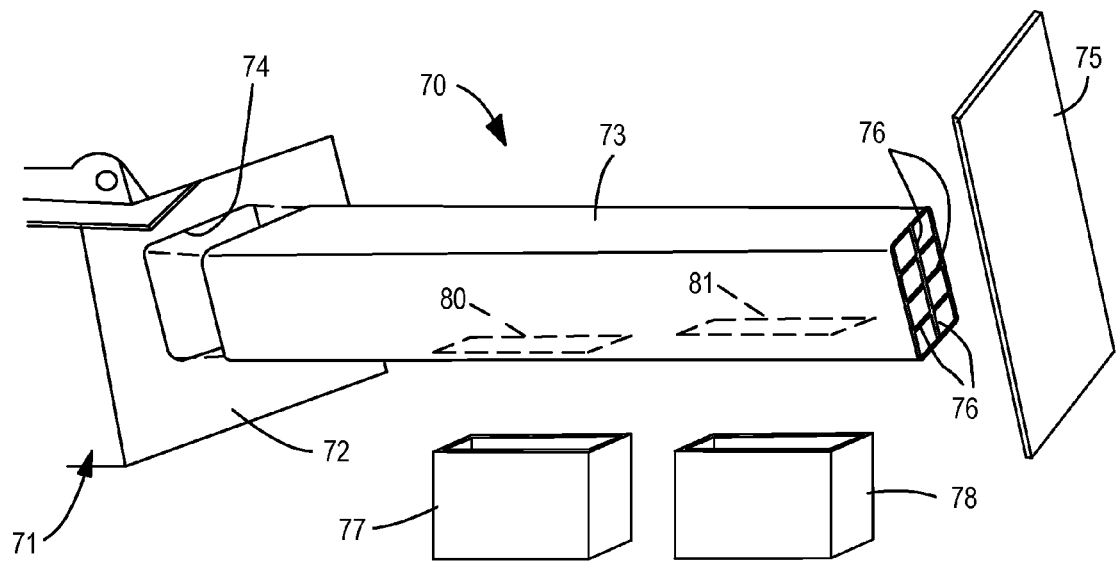
FIG. 8 is an exploded, perspective view showing a plastic cross member with interior stiffening ribs according to a fourth embodiment.
Figure 9:
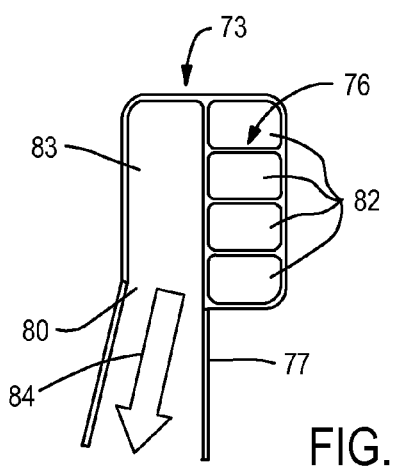
FIGS. 9 and 10 are cross-sectional views of the plastic cross member of FIG. 8 through each of the floor outlets, respectively.
Figure 10:
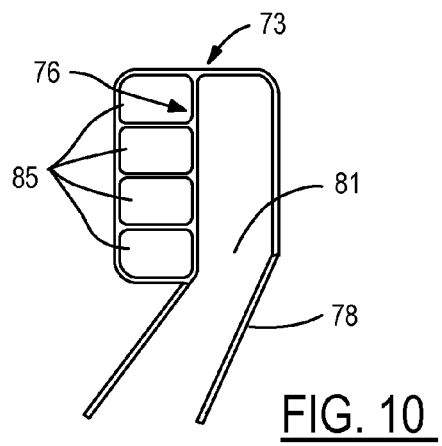

Another embodiment is shown in FIGS. 8-10 wherein a plastic cross member 70 has a hollow beam 73 coupled between a center plate component 71 and a terminal rib 75, each of which are separately fabricated. Center plate 71 has an angled face 72 with an aperture 74 receiving one end of hollow beam 73. Beam 73 includes internal stiffening ribs 76 which include at least one vertical rib or wall dividing hollow beam 73 into fore and aft sections. Horizontal internal stiffening ribs or walls are also provided for additional strength, resulting in sets of stacked channels or tubes in the fore and aft sections of beam 73. A pair of floor outlet tube extensions or nozzles 77 and 78 are provided for connecting with outlet apertures 80 and 81 formed at the bottom of the fore and aft sections, respectively. In this embodiment, hollow beam 73 can be formed by a thermoplastic extrusion process since the same general shape is maintained laterally across beam 73. Secondary operations (e.g., cutting) may be employed to form apertures 80 and 81 together with corresponding openings or gaps in the respective horizontal stiffening ribs in order to fluidically couple each separate channel with the respective aperture and to create a desirable flow pattern. Beam 73 can be connected with center plate 71, terminal rib 75, and outlets 77 and 78 using known secondary operations such as bonding or plastic welding, for example.

FIG. 9 shows a transverse cross-section through floor outlet 77 depicting the removal of a portion of the outer wall of beam 73 at the forward section to form aperture 80 and removal of a portion of the horizontal stiffening ribs above aperture 80 to form an open space 83 so that all the forward channels contribute to the floor outlet flow. Horizontal stiffening ribs and the vertical rib are not removed, so that aft channels 82 are not disturbed. Thus, air flow may enter beam 73 at face 72 and exit from the forward channels within beam 73 through outlet 77 as a floor-directed air flow 84. Similarly, FIG. 10 shows a cross-section through hollow beam 73 at the location of floor outlet 78 wherein the same vertical stiffening rib and fore and aft sections are seen within beam 73. In this region, forward channels 85 are undisturbed. Aperture 81 is cut into beam 73 and a portion of the horizontal stiffening ribs are removed in aft channels 82 in order to provide an air flow from the aft channels into floor outlet 78.

What is claimed is:

1. A cross-car structure for a vehicle having a body with first and second sides and a floor, comprising:
   an upper steel beam with first and second opposing ends for attaching to the first and second body sides;
   a pair of center brackets extending downward from the upper steel beam;
   an HVAC unit secured with respect to at least one of the center brackets and having an outlet for an air flow for ventilating a floor region above the floor and between the first and second body sides; and
   a plastic cross member having a center plate secured with respect to the center brackets, a first hollow beam extending from the center plate to the first end of the steel beam, and a second hollow beam extending from the center plate to the second end of the steel beam, wherein each hollow beam has an in-board opening fluidically coupled to the outlet of the HVAC unit, wherein each hollow beam has at least one floor outlet directed toward the floor region thereby providing a respective HVAC duct between the outlet of the HVAC unit and each of the floor outlets, wherein each hollow beam has a terminal rib at a remote end opposed to the in-board opening that seals the remote end, wherein each terminal rib is secured to a respective end of the upper steel beam, wherein each hollow beam further comprises at least one interior stiffening rib longitudinally dividing at least a portion of each hollow beam, wherein one of the hollow beams has a pair of longitudinally spaced floor outlets, wherein the respective interior stiffening rib within the one hollow beam provides separate longitudinal ducts each coupled to a respective floor outlet, and wherein the respective interior stiffening rib is generally horizontal from a respective in-board opening to a position above one floor outlet and has a vertical end portion between the pair of floor outlets to provide a divided airflow separately directed to each of the floor outlets.

2. The structure of claim 1 wherein the hollow beams further comprise a plurality of stiffening ribs extending exteriorly from the ducts, wherein the stiffening ribs include a first group of ribs extending longitudinally as planar fins along the hollow beams, and wherein the stiffening ribs include a second group of ribs oriented substantially transverse to and intersecting the first group of ribs.

3. The structure of claim 1 wherein the opposing ends of the upper steel beam are each comprised of a steel plate extending downward to be secured to a respective terminal rib.

4. The structure of claim 1 wherein the center plate is integrally molded with at least a portion of the first hollow beam and at least a portion of the second hollow beam.

5. The structure of claim 1 wherein the HVAC unit is secured to both first and second edges of the center plate for stiffening the center plate.

6. The structure of claim 1 further comprising at least one lower bracket coupled between the center plate and the body floor.

* * * * *